US010079391B2

(12) United States Patent
Kjeang et al.

(10) Patent No.: US 10,079,391 B2
(45) Date of Patent: Sep. 18, 2018

(54) FUEL CELL WITH FLOW-THROUGH POROUS ELECTRODES

(75) Inventors: Erik Kjeang, Haverdal (SE); David Sinton, Victoria (CA); Nedjib Djilali, Victoria (CA)

(73) Assignee: UVic Industry Partnerships Inc., Victoria, BC (CA)

( * ) Notice: Subject to any disclaimer, the term of this patent is extended or adjusted under 35 U.S.C. 154(b) by 1708 days.

(21) Appl. No.: 11/869,277

(22) Filed: Oct. 9, 2007

(65) Prior Publication Data

US 2009/0092882 A1 Apr. 9, 2009

(51) Int. Cl.
*H01M 2/38* (2006.01)
*H01M 4/86* (2006.01)
*H01M 8/18* (2006.01)

(52) U.S. Cl.
CPC ......... *H01M 4/8605* (2013.01); *H01M 8/188* (2013.01); *Y02E 60/528* (2013.01)

(58) Field of Classification Search
CPC .... H01M 4/8605; H01M 8/188; Y02E 60/258
See application file for complete search history.

(56) References Cited

U.S. PATENT DOCUMENTS

| | | | | |
|---|---|---|---|---|
| 3,415,734 | A * | 12/1968 | Kalhammer | 204/284 |
| 4,500,395 | A * | 2/1985 | Nakamura | 204/284 |
| 6,811,916 | B2 | 11/2004 | Mallari et al. | |
| 7,157,177 | B2 | 1/2007 | Chan | |
| 2004/0058217 | A1* | 3/2004 | Ohlsen et al. | 429/34 |
| 2004/0072047 | A1* | 4/2004 | Markoski et al. | 429/34 |
| 2004/0096721 | A1* | 5/2004 | Ohlsen et al. | 429/34 |
| 2005/0084737 | A1* | 4/2005 | Wine et al. | 429/38 |
| 2005/0084738 | A1* | 4/2005 | Ohlsen et al. | 429/39 |
| 2006/0088744 | A1* | 4/2006 | Markoski et al. | 429/14 |
| 2007/0287034 | A1* | 12/2007 | Minteer et al. | 429/2 |

FOREIGN PATENT DOCUMENTS

| | | | | |
|---|---|---|---|---|
| WO | WO 02086994 A1 * | 10/2002 | | H01M 4/86 |
| WO | WO 2004095605 A2 * | 11/2004 | | |

OTHER PUBLICATIONS

E. Kjeang et al., "Planar and three-dimensional microfluidic fuel cell architectures based on graphite rod electrodes", Journal of Power Sources 168 (2007) 379-390.*
R. Ferrigno et al., "Membraneless Vanadium Redox Fuel Cell Using Laminar Flow", JACS Communication, 2002, 124. 12930-12931.*
Kjeang, E. et al.,High-Performance Microfluidic Vanadium Redox Fuel Cell, Electrochimica Acta, 2007, p. 4942-4946, 52-15, Elsevier Ltd., Orlando, USA.
Duffy, D.C. et al, Rapid Prototyping of Microfluidic Systems in Poly(dimethylsiloxane), Analytical Chemistry, 1998, p. 4974-4984, 70-1998, ACS Publications, Washington DC, USA.
Kjeang et al., Planar and Three-Dimensional Microfluidic Fuel Cell Architectures Based on Graphite Rod Electrodes, J. of Power Sources, 2007, 379-390, 168-2, Elsevier Ltd, USA.

* cited by examiner

*Primary Examiner* — Raymond Alejandro
(74) *Attorney, Agent, or Firm* — Klarquist Sparkman, LLP

(57) ABSTRACT

A microfluidic fuel cell with flow-through architecture is provided. The anode and the cathode are porous electrodes and comprise an interstitial pore network. A virtual insulator is located between the electrodes, in an electrolyte channel. The virtual insulator is comprised of a co-laminar flow of an electrolyte. An inlet directs substantially all the flow of liquid reactant through the porous electrode.

4 Claims, 15 Drawing Sheets

FUEL CELL WITH FLOW-THROUGH POROUS ELECTRODES

FIELD

The present technology is related to microfluidic fuel cells. More specifically, it relates to fuel cells with at least one three-dimensional, flow-through, porous electrode.

BACKGROUND

The "energy gap" in portable electronics is making microstructured fuel cells an increasingly attractive technology. Microfluidic fuel cells, or laminar flow-based fuel cells, represent a new type of small scale fuel cell technology based on inexpensive microfabrication methods and low-cost materials. A microfluidic fuel cell is defined as a device that incorporates all fundamental components of a fuel cell to a single microfluidic channel and its walls. These fuel cells operate without a membrane, and the most common configurations rely on the laminar nature of microscale flows to maintain sufficient separation of fuel and oxidant streams. Ionic charge transfer is facilitated by a supporting electrolyte contained in the co-laminar streams. Inter-diffusion is restricted to an interfacial width at the center of the channel, and the electrodes are positioned sufficiently far away from this inter-diffusion zone to prevent crossover effects. Microfluidic fuel cells provide a number of unique advantages: fuel and oxidant streams may be combined in a single microchannel; no ion exchange membrane is needed; sealing, manifolding, and fluid delivery requirements are reduced; and issues related to membrane hydration and water management are eliminated.

Proof-of-concept microfluidic fuel cell devices have been demonstrated based on a number of fuels, including vanadium ions, formic acid, methanol, hydrogen, and hydrogen peroxide, combined with oxidants such as vanadium ions, oxygen, or hydrogen peroxide. The power densities of these cells were mainly restricted by the solubility of the reactants and the associated rate of convective/diffusive mass transport to the active sites. Cell designs using oxygen have the benefit of 'free' oxidant available in the ambient air. Air-breathing designs, however, require a blank cathodic electrolyte stream and have shown moderate power densities. The highest power density levels of the microfluidic fuel cells reported to date were achieved using vanadium redox couples in both half-cells; $V^{2+}/V^{3+}$ as anolyte and $VO^{2+}/VO_2^{+}$ as catholyte. These vanadium redox fuel cells benefit from a rapid and balanced electrochemical system in terms of species transport characteristics and reaction rates, as well as a relatively high open-circuit voltage (~1.5 V). In addition, the vanadium redox reactions take place on carbon electrodes without any electrocatalyst requirements. In the foregoing microfluidic fuel cell designs, the reactants, products and electrolyte are typically in the same liquid phase, and the reaction zones are simple solid-liquid interfaces. These characteristics provide potential for a variety of three-dimensional fuel cell architectures.

One such design is disclosed in U.S. Pat. No. 7,157,177. The electrode structure adapted for use with a fuel cell system (e.g., a hydrogen or a direct hydrocarbon fuel cell system), has an electrode structure comprising a substrate or support structure having one or more discrete porous bulk matrix regions disposed across a top surface of the substrate. Each of the one or more discrete porous bulk matrix regions is defined by a plurality of acicular pores that extend through the substrate or support structure. The plurality of acicular pores define inner pore surfaces, and the inner pore surfaces have a conformal electrically conductive layer thereon, as well as a plurality of catalyst particles.

The capability of reaching high levels of fuel utilization per single pass has been a major challenge associated with microfluidic fuel cell technology to date. It is an object of the present technology to overcome the deficiencies in the prior art.

SUMMARY

The present technology provides a fuel cell architecture that has the advantages of: (i) a three-dimensional porous electrode that provides a large reaction zone with high active surface area; (ii) a flow-through reactant supply guided directly through the majority of the porous electrode, providing enhanced rates of convective/diffusive transport to and from the active sites, thereby improving current density and overall fuel utilization per single pass; (iii) hydrophilic or hydrophobic electrode treatment that promotes saturation of the porous electrode, and thus increases the effective active area; and (iv) it can regenerate the fuel in situ.

In accordance with an embodiment of the technology, a fuel cell, for use with liquid reactants is provided. The fuel cell comprises: an anode, and a cathode, wherein at least one of the anode or the cathode are porous electrodes; an electrolyte channel, defined by said anode and cathode; a virtual insulator, wherein the virtual insulator is comprised of a co-laminar flow of an electrolyte through the electrolyte channel; at least one inlet for directing substantially all the flow of liquid reactant through the porous electrode; and an outlet.

In one aspect both the anode and the cathode are porous electrodes.

In another aspect, the porous electrode comprises an interstitial pore network.

In another aspect, the porous electrodes and outlet are positioned to provide orthogonally arranged flow of liquid reactants towards the outlet, in use.

In another aspect, the fuel cell further comprises a catalyst on at least one porous electrode.

In another aspect, the fuel cell further comprises at least one ion-conducting polymer on at least one porous electrode.

In another aspect, the catalyst is an electrocatalyst.

In another aspect, the catalyst is a biological catalyst.

In another aspect, the porous electrode is a hydrophilic porous electrode.

In another aspect, the fuel cell further comprises an ion-conducting membrane at least partially interposed between the electrodes of the fuel cell.

In another aspect, the fuel cell further comprises a permeable spacer at least partially interposed between the electrodes of the fuel cell.

In another embodiment a fuel cell is provided that comprises:

liquid reactants, wherein there is an anodic reactant and a cathodic reactant;

an anode, and a cathode, wherein at least one of the anode or the cathode are porous electrodes; an electrolyte channel, defined by the anode and cathode; a virtual insulator, wherein the virtual insulator is comprised of a co-laminar flow of an electrolyte through the electrolyte channel; at least one inlet for directing substantially all the flow of liquid reactant through the porous electrode; and an outlet.

In one aspect, the electrolyte and the anodic reactant are mixed as they flow through the anode, and the electrolyte and the cathodic reactant are mixed as they flow through the cathode.

In another aspect, the flow through at least one of the anode and cathode is two-phase flow.

In another aspect, both the anodic reactant and the cathodic reactant mix with the electrolyte as they flow through both the anode and the cathode.

In another aspect, the liquid reactants flow orthogonally towards the outlet.

In another aspect, the fuel cell comprises one reactant outlet per electrode.

In another aspect, the flow of reactant through the porous electrode is directed in parallel with the electrolyte towards a reactant outlet.

In another aspect, the fuel cell comprises an ion-conducting membrane at least partially separating the flows of the co-laminar flow.

In another aspect, the fuel cell comprises a permeable spacer at least partially separating the flows of the co-laminar flow.

In another aspect, the reactants are $V^{2+}$ and $VO_2^+$.

In another aspect, the reactants are formate and hypochlorite.

In accordance with another embodiment of the technology a fuel cell is provided comprising: an anodic reactant, $V^{2+}$ and a cathodic reactant, $VO_2^+$;

an anode, and a cathode, wherein both:

(i) the anode and the cathode are porous electrodes;

(ii) the anode and the cathode are hydrophilic; and (iii) the anode and cathode comprise an interstitial pore network;

an electrolyte channel, defined by said anode and cathode; a virtual insulator, wherein the virtual insulator is comprised of a co-laminar flow of an electrolyte through the electrolyte channel; at least one inlet for directing substantially all the flow of liquid reactant through the porous electrode; and an outlet.

The foregoing and other objects, features, and advantages of the invention will become more apparent from the following detailed description, which proceeds with reference to the accompanying figures.

DETAILED DESCRIPTION

Figure 1:
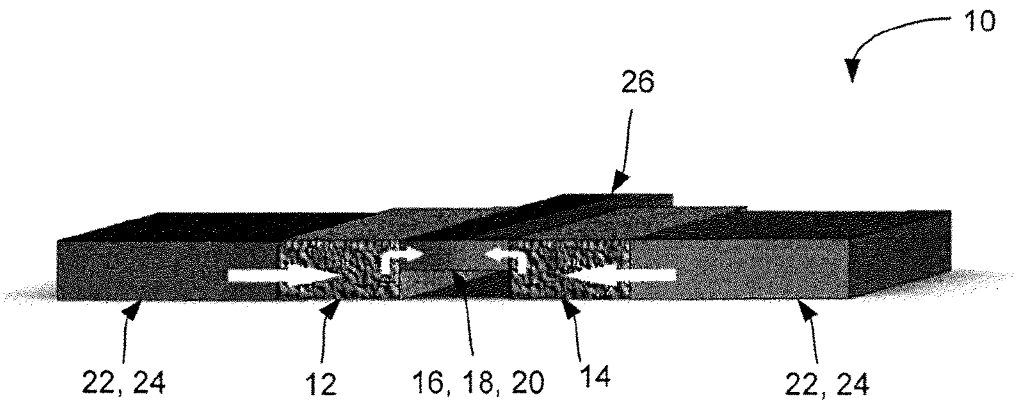
FIG. 1 shows a cross sectional view of a microfluidic fuel cell architecture with flow-through porous electrodes in accordance with an embodiment of the technology.

Reactants are the species that are undergoing electrochemical reaction at the anode and cathode, respectively, to produce the cell current and power output. In the case of vanadium redox species, they are $V^{2+}$ (fuel) and $VO_2^+$ (oxidant), both are aqueous. When supported by an electrolyte, the reactants can also be referred to as the anolyte ($V^{2+}$) and the catholyte ($VO_2^+$). Liquid and/or gaseous fuels can be used directly or mixed with a liquid electrolyte, and solid fuels can be dissolved in the electrolyte; appropriate fuels include but are not limited to hydrogen, methanol, ethanol, formaldehyde, acetaldehyde, formic acid, formates, borohydrides, hydrazine, glucose, fructose, sucrose, galactose, carboxylate anions, alcohols, aldehydes, liquid hydrocarbons, gaseous hydrocarbons, carbohydrates, vanadium redox species, vanadium-bromide redox species, vanadium-chloride redox species, ruthenium redox species, uranium redox species, neptunium redox species, titanium redox species, chromic/chromous redox species, chromium complexes, iron complexes, sulfide/polysulfide redox species, wastewater and wastewater derivatives, metal hydrides.

Liquid and/or gaseous oxidants can be used directly or mixed with a liquid electrolyte, and solid oxidants can be dissolved in the electrolyte; appropriate oxidants include but are not limited to oxygen, air, peroxides, perchlorates, chlorates, chlorites, hypochlorites, hypohalites, permanganates, manganates, hypomanganates, manganites, peroxodisulfates, ceric ammonium nitrates, persulfuric acid, ozone, halogens, halogen compounds, hexavalent chromium compounds, chromium complexes, vanadium redox species, polyhalide/halide redox species, ruthenium redox species, uranium redox species, neptunium redox species, ferricyanide/ferrocyanide redox species, ferric/ferrous redox species, ferrocenium/ferrocene redox species, iron complexes, cerium(IV)/cerium(III) compounds, bromide/bromine redox species, iodide/polyiodide redox species, chloride/chlorine redox species.

With respect to the microstructure of a porous electrode, the only direct requirement is that it is porous and facilitates liquid and/or gaseous flow of reactant through the pores. Also, the solid structure needs to be electrically conductive to collect the current from the electrochemical reactions, but this can also be facilitated by depositing a conductive layer on the surface of the solid porous material, i.e. the porous material itself does not have to be conductive. The porosity should be relatively constant spatially to facilitate uniform flow distribution; however a porosity gradient could be included to optimize the flow distribution in the porous electrode and the performance of the fuel cell. Porous materials include, but are not limited to fibrous carbons, porous metals, felts, papers, cloths, activated carbons, silica, gels, foams, sponges, ceramics, filters, meshes, wicks, membranes, polymers, and metal-organic frameworks. The porosity should be 20-99%, more preferably 40-95% and still more preferably 60-90%. The pore size is preferably about 1-120 micrometers, more preferably 25-100 micrometers and still more preferably 75-100 micrometers. The porous material should be relatively open to the flow such that the pressure drop and associated pumping power is less than 100% of the power generated by the fuel cell. It is also important that the porous material has high overall surface area exposed to the flow, at least about 10 times larger than the vertically projected geometric surface area of the porous electrode; more preferably about 50 times larger, and still more preferably about 100 times larger.

A flow through fuel cell is a fuel cell with flow through architecture.

The electrolyte is one means of closing the electrical circuit in fuel cells. Between the electrodes, the cell current is carried by ions, and the ionic conductivity depends on the concentration and type of electrolyte. A fuel cell electrolyte with high ionic conductivity typically contains a relatively high concentration of small ions with high mobility such as hydronium or hydroxide ions. The electrolyte can be considered passive, as it does not participate in any reactions. In co-laminar flow-based microfluidic fuel cells a supporting electrolyte is present within both fuel and oxidant streams. In most other types of fuel cells, ionic conduction between the electrodes is facilitated by an ion-exchange membrane. Another option is to apply a permeable layer of ionomer to the solid structure of the porous electrode, to provide a pathway for ions from the porous electrode to the ion-exchange membrane or electrolyte space between the electrodes of the fuel cell.

The fuel cell may contain one or several different electrolytes; typically the fuel is mixed with one electrolyte and the oxidant is mixed with another electrolyte; more typically the fuel and oxidant are supported by the same type of electrolyte. The electrolytes can be liquids or ionic liquids, typically strong electrolytes diluted in water or organic solvents. Ideally, the electrolyte should have higher concentration than the fuel and oxidants, to provide effective ion transport between the electrodes with low solution resistance and to prevent electromigration effects of fuel and/or oxidant species. The electrolyte can be acidic, neutral, or alkaline; aqueous or organic; and may contain sulfuric acid, perchloric acid, nitric acid, hydrochloric acid, hydrobromic acid, hydroiodic acid, phosphoric acid, acetic acid, citric acid, perchloric acid, methanesulfonic acid, phosphate, citrate, sodium hydroxide, potassium hydroxide, hydroxides, ammonia, sodium chloride, potassium chloride, halide compounds, acetonitriles, tetraethyl-ammonium tetrafluoroborate, tetraethyl-ammonium perchlorate, tetrabutyl-ammonium perchlorate, imidazolium-based ionic liquids, ionic liquids.

FIG. 1 shows a fuel cell architecture with flow-through porous electrodes, comprising at least one fuel cell 10. The fuel cell 10 has two electrodes 12, 14 electrically insulated from each other and physically separated by an ion-conducting membrane 16 or electrolyte 18 in an electrolyte channel 20 or a combination thereof. Reactants 22 are supplied to the electrodes 12, 14 by at least one inlet 24 per electrode 12, 14 and exit via an outlet 26. A reactant outlet is also provided for each electrode 12, 14. At least one of the electrodes 12, 14 is porous and facilitates flow of reactant 22 directly through the interstitial pores inside the porous medium without additional channels, grooves or external flow fields. The side surfaces of the porous electrode parallel to the direction of the flow are sealed to prevent the flow from escaping the porous medium. The entire solid phase of the porous electrode is electrochemically active, such that a 3-D reaction zone is obtained. This expansion of the reactive layer in the third dimension provides increased active area, which combined with the flow-through architecture enables improved utilization of the active sites and enhanced rates of convective/diffusive mass transport. The large 3-D active area combined with efficient mass transport inside the porous medium enables enhanced fuel cell performance.

Example 1: Microfabrication

Figure 2:
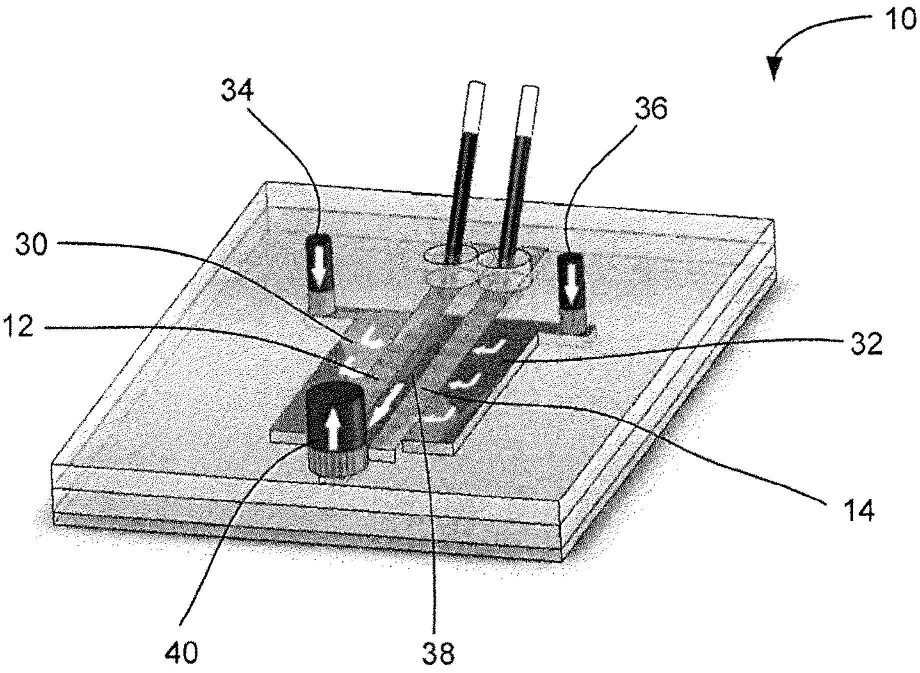
FIG. 2 shows a schematic view of a microfluidic fuel cell architecture with flow-through porous electrodes in accordance with an embodiment of the technology.

Microfluidic fuel cells of the flow-through porous electrode architecture, shown schematically in FIG. 2, were assembled using in-house developed microfabrication techniques. The previous architecture will be termed 'flow-over,' to differentiate it from the 'flow-through' architecture of the present technology. The fabrication procedures for the two designs differ somewhat and are presented separately in the following subsections.

(i) Flow-Through Architecture Fuel Cell

Porous carbon strip electrodes were cut to size (20 mm long and 1 mm wide) from sheets of Toray carbon paper (B-2 Designation TGPH-090; E-TEK, Somerset, N.J.) with typical thickness 300 μm (measured), typical density 0.49 g $cm^{-3}$ and 78% porosity. The carbon strips were rendered hydrophilic by annealing (~1 s) in a propane flame. The heat treated carbon strips were fitted in custom-sized grooves (20 mm×1 mm×300 μm, separated by 1 mm), fabricated by replica molding in poly(dimethylsiloxane) (PDMS; Dow Corning, Midland, Mich.) according to established soft-lithographic protocols [1]. A 300 μm high master that defines the two grooves plus the channel structure was created by photolithography in negative photoresist (SU-8 50; Microchem, Newton, Mass.). The master had a dual-layer structure. The first layer was 150 μm thick and encompassed all flow channels and electrode grooves. The second layer, which was also 150 μm thick and patterned on top of the first layer, included electrode grooves and the channel pattern from the inlets to the electrodes.

Upon casting of this dual-layered master into PDMS, a negative imprint was obtained that accommodated both electrode grooves and complete fluid manifolding. The obtained PDMS part was placed face up on a 1"×3" microscope glass slide for structural support, and the heat treated carbon strip electrodes were fitted in its grooves, thereby finalizing the bottom part of the fuel cell. The top of the cell was sealed with a flat layer of PDMS, with previously punched holes for the inlets, outlet, and electrical contacts.

An irreversible seal was created by plasma-treating both PDMS parts, which renders hydrophilic channel walls and facilitates covalent binding upon assembly. The holes in the top PDMS part were aligned carefully with the grooves of the bottom part during assembly of the final device.

The electrodes of the assembled fuel cell had an active volume of 0.3 mm×1 mm×12 mm (3.6 μL). Wires were attached to the exposed ends of the carbon electrodes using PELCO® conductive silver 187 (Ted Pella Inc., Redding, Calif.). The co-laminar flow of vanadium solutions through the fuel cell was driven by a syringe pump (PHD 2000; Harvard Apparatus, Holliston, Mass.) via Teflon® tubing (1/16" diameter; S.P.E. Limited, North York, ON, Canada) to the inlets and a larger Tygon® tube (3 mm diameter; Fisher Sci., Pittsburgh, Pa.) from the outlet to the outlet reservoir. The described fabrication procedure is relatively quick and economical. Excluding external wires and tubes, the fuel cell contained only PDMS and carbon paper, and the total estimated material cost is 2 USD per cell.

(ii) Flow-Over Architecture Fuel Cell

Fuel cells with the flow-over architecture were fabricated according to the procedure outlined above, with the following modifications: The flow-over unit consisted of two parts. A bottom PDMS part contained the electrodes and a top PDMS part accommodated the microfluidic channel network. The bottom part was a PDMS slab with two custom-shaped grooves (20 mm×1 mm×300 μm) separated by 1 mm. The carbon strip electrodes were fitted into these grooves. The top part contained a T-shaped 150 μm high and 3 mm wide microchannel that was aligned with the carbon electrodes during assembly.

(iii) Preparation of Vanadium Solutions

Vanadium stock electrolyte was purchased from Highveld, South Africa, and received as 2 M vanadium redox species (50/50 $V^{3+}/VO^{2+}$) in 4 M sulfuric acid with proprietary stabilizing agents from Highveld Steel and Vanadium Corporation Limited in Witbank, South Africa.

The $V^{2+}$ and $VO_2^+$ solutions used as anolyte and catholyte, respectively, were generated from the stock electrolyte in a large-scale electrolytic flow cell with 4" by 6" carbon felt electrodes divided by a Nafion membrane. Equal parts of the vanadium stock electrolyte were poured into the positive and negative half-cells. The negative half-cell was continuously purged with nitrogen, given the instability of the $V^{2+}$ solution in contact with air. The solutions were pumped through the cell while applying a fixed current density of 65 mA $cm^{-2}$ (10 A). The cell voltage was 1.5-1.7 V while charging. Charging of the solutions was complete after 50 min when the cell voltage quickly rose above 2.0 V, which was also confirmed by the sudden color change in the two compartments. The fully charged purple $V^{2+}$ solution and yellow $VO_2^+$ solution were removed and stored under a nitrogen blanket in air-tight bottles. The current efficiency during charging was calculated to be 99.7%. No hydrogen or oxygen bubbles were produced during the experiment, attributed to the use of carbon electrodes.

(iv) Results and Discussion

Microfluidic vanadium redox fuel cell operation is based on the following anodic and cathodic redox reactions and associated standard redox potentials at 298 K:

$$V^{3+}+e^{-}V^{2+}\ E°=-0.496\text{ V vs. }SCE \quad (1)$$

$$VO_2^{+}+2H^{+}+e^{-}VO^{2+}+H_2O\ E°=0.750\text{ V vs. }SCE \quad (2)$$

The overall cell reaction has a theoretical standard cell potential of 1.246 V. The cell potential can however be increased beyond 1.50 V by the use of high-purity vanadium solutions. The theoretical maximum current density of a microfluidic fuel cell is controlled by the rate of convective/diffusive transport of reactants and products in the liquid phase to and from the surface of the electrodes. In the limiting case, the concentration of reactant is zero at the surface, and a concentration boundary layer is formed in the channel that limits the flux of reactant to the surface depending on the flow characteristics. Overall fuel cell performance, usually measured by power density, is however influenced by other factors as well. In our previous study of microfluidic vanadium redox fuel cells with planar electrodes based on graphite rods [Kjeang et al., J. Power Sources 168 (2007) pp. 379-390], it was found that the performance of the cell was controlled by a combination of species transport, electrochemical kinetics and ohmic resistance. Improved performance was enabled by the implementation of porous electrodes [Kjeang et al., Electrochim. Acta 52 (2007) pp. 4942-4946], the overall electrochemical kinetics were improved by the increased active surface area, and the rate of species transport to the active sites was enhanced by a partial flow velocity inside the top portion of the porous medium, although the penetration depth was limited.

Figure 3:
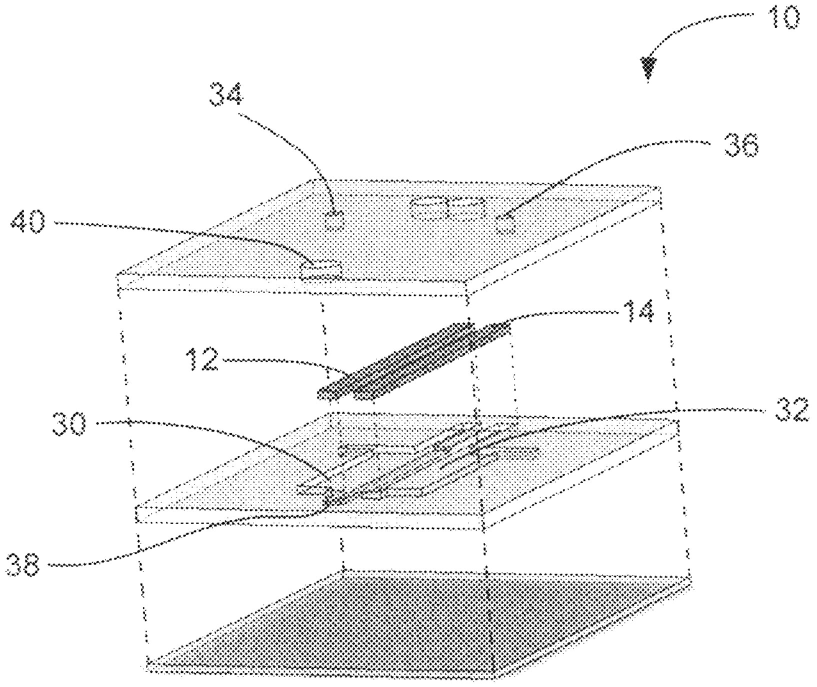
FIG. 3 shows an exploded view of the layers of the microfluidic fuel cell architecture seen in FIGS. 1 and 2.

The microfluidic vanadium redox fuel cells employed here are shown schematically in FIG. 2. In contrast to the flow-over cell, the flow-through cell 10 is designed to direct the flow of vanadium fuel 30 and oxidant 32 solutions uniformly through the porous electrode structures 12, 14. This strategy achieves utilization of the full depth of the electrode 12, 14 and associated active area, and provides enhanced species transport from the bulk to the active sites. The electrolyte streams 30, 32 enter the fuel cell 10 on each side via a deep (300 μm) feed section 34, 36 that distributes the flow towards the side of the porous strip electrode 12, 14. The flow is guided at a low mean velocity from the feed section 34, 36 orthogonally through the 300 μm deep and 1 mm wide porous electrode 12, 14 into the less deep (150 μm) co-laminar exit section 38, where it is brought downstream to the outlet 40 at a significantly higher mean velocity. FIG. 3 shows an exploded view of the layers of the fuel cell architecture with flow-through porous electrodes seen in FIGS. 1 and 2.

The co-laminar exit section 38, which effectively employs the waste solutions as an ionic charge transfer medium, was given a high aspect ratio (width/depth) cross-sectional profile to confine the inter-diffusion/crossover zone to the center of the channel. In the flow-over cell diffusive mixing in the co-laminar channel represents loss of reactant, or fuel/oxidant cross-over. In contrast, in the flow-through cell 10 the reactants are consumed prior to reaching the central channel, and the co-laminar streaming merely separates the waste products of the electrodes while providing proton transport. With respect to flow distribution in the flow-through cell 10, the pressure drop over the porous electrode 12, 14 is an estimated two orders of magnitude higher than the serially connected distribution channel. Thus assuming an effectively uniform pore distribution, a spatially uniform flow rate of reactant through the porous electrode is expected.

The microfluidic fuel cell with flow-through porous electrodes was operated at flow rates spanning three orders of magnitude, from 1 to 300 μL $min^{-1}$ per stream, using 2 M vanadium ions in 4 M sulfuric acid electrolyte. An advantage inherent to the use of the optically transparent PDMS material in combination with the distinctive colors of the vanadium species is that fuel cell operation under co-laminar flow can be observed visually. When the fuel cell was operated at open-circuit, i.e. no current was drawn from the cell, the anolyte ($V^{2+}$—violet) and catholyte ($VO_2^+$—black) streams passed through the electrodes orthogonally and filled the co-laminar exit section between the electrodes from both sides. The microfluidic co-laminar flow characteristics were maintained towards the outlet and diffusive mixing was restricted to the center of the channel. The absence of electrochemical reactions at the open-circuit voltage was confirmed by the uniform colors. When the fuel cell was operated under steady state at 0.8 V cell voltage, as current was drawn from the cell, the violet color of the anolyte changed to light green ($V^{3+}$) and the black color of the catholyte changed to turquoise ($VO_2^+$), as the solutions passed through the porous electrodes. The distinct color change provided an optical indication that much of the initial vanadium species had undergone electrochemical reaction, and that mixing of the streams was still restricted to the center of the channel.

Example 2

(i) Fuel Cell Diagnostics

Polarization data were measured after flow stabilization at a given flow rate by chronoamperometry under stepwise potentiostatic control from 0.0 V to the open circuit voltage by 0.2 V increments, using a PARSTAT 2263 potentiostat (Princeton Applied Research, Oak Ridge, Tenn.). The current generated by the cell was monitored until steady state was reached (30-300 s, depending on the flow rate). Anodic and cathodic polarization were measured using the opposite in-channel carbon electrode as counter electrode and an external saturated calomel reference electrode (SCE) placed in the outlet reservoir. Due to the three-dimensional architecture, it is somewhat awkward to define an area with which to characterize the performance of the flow-through cell in terms of current density. Specifically, the flow-normal area of each electrode is 300 μm×12 mm (0.036 $cm^2$), while the vertically-projected area of each electrode is significantly larger (1 mm×12 mm=0.12 $cm^2$). Current densities and power densities reported here were calculated based on the larger, vertically-projected area of the electrodes.

The ohmic resistance of the fuel cell was measured by electrochemical impedance spectroscopy (EIS), using the same potentiostat. Impedance spectra were recorded for each flow rate at the open-circuit cell voltage, by applying an ac amplitude of 5 mV rms over the frequency range from 50 kHz to 0.1 Hz. The combined ohmic cell resistance was obtained from the high-frequency real axis intercept of the Nyquist plot of impedance.

ii) Results and Discussion

Figure 4:
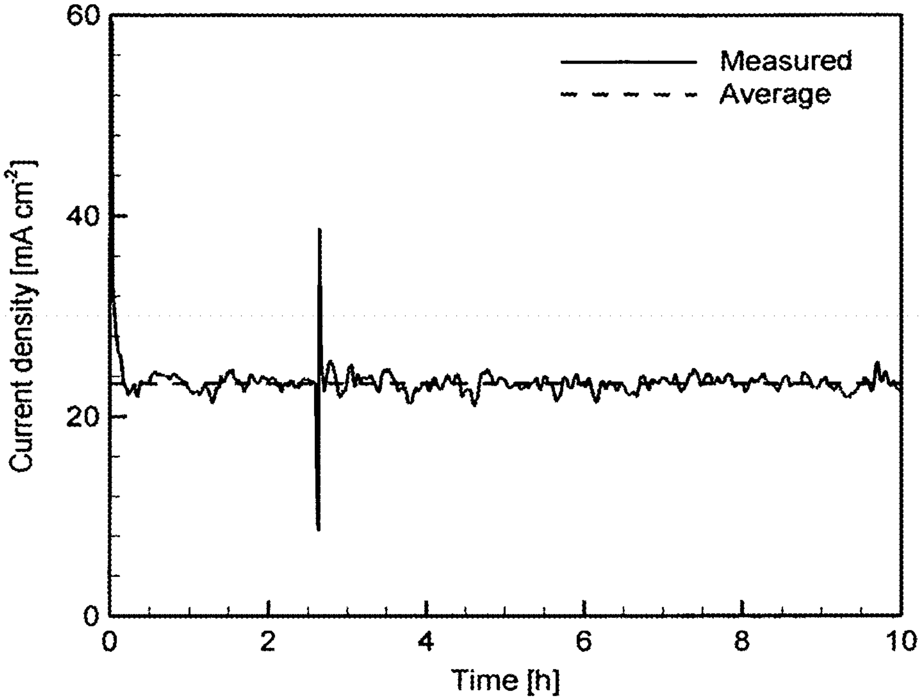
FIG. 4 shows flow-through fuel cell steady state chronoamperometric data measured at 0.8 V cell voltage and 1 μL $min^{-1}$ flow rate at room temperature.

Steady state polarization data were obtained at room temperature under potentiostatic control. The results were also reproducible under galvanostatic control, and the average standard deviation of repeated experimental trials was less than 1% with the same cell and within 7% using different cells. The stability of the current generated by the flow-through architecture fuel cell was evaluated by an extended potentiostatic experiment performed at a practical cell voltage (0.8 V) in the low flow rate regime (1 μL $min^{-1}$), the result of which is shown in FIG. 4. After a brief transient period, the current density was quite steady throughout the entire 10 h time period, showing typical variations of ±2%. No performance degradation was detected during this test; in fact, the highest hourly-averaged current density in the steady phase was recorded during the $8^{th}$ hour. Deviations about the average current density are attributed to the low flow rate and the associated unsteady reactant feed; at higher flow rates, the current density is expected to have less noise.

Figure 5:
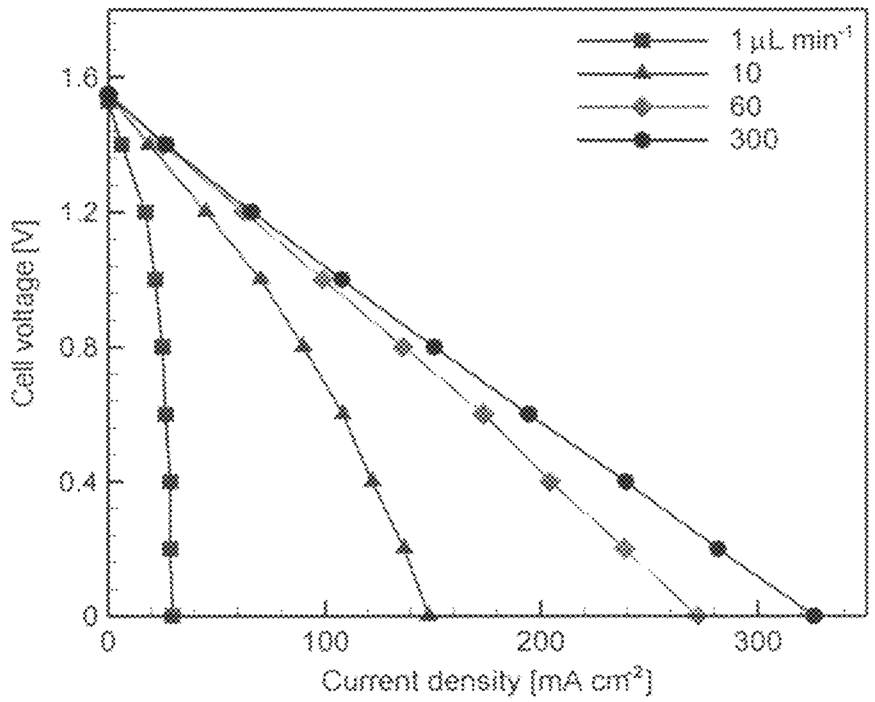
FIG. 5 shows flow-through fuel cell polarization data obtained under potentiostatic control at steady state and room temperature, using four different flow rates (as indicated).

The polarization curves in FIG. 5 show steady state operation of the flow-through fuel cell at four different flow rates from 1 to 300 μL $min^{-1}$. The highest flow rate used here corresponds to Reynolds numbers from Re~$10^{-2}$ in the porous medium up to Re~20 at the outlet of the co-laminar exit channel. The open-circuit voltage of the fuel cell was 1.53-1.55 V, and current densities up to 326 mA $cm^{-2}$ were generated. Several trends can be identified based on these data: As expected, the current density increased with flow rate, which is a consequence of significant mass transport control combined with relatively fast electrochemical redox reactions. However, the steep negative slope observed at the lowest flow rate, associated with predominant mass transport control, becomes less significant as the flow rate is increased. Above 60 μL $min^{-1}$ the slopes of the polarization curves become more linear and further increasing the flow rate results in only marginally increased performance. This effect is attributed to the parasitic ohmic voltage loss caused by series resistance in the cell, which is proportional to the current density. The combined ohmic resistance, including both in-channel ionic resistance and electrical resistance in electrodes, contacts and wires, was measured by electrochemical impedance spectroscopy (EIS) to be 27.6Ω at 300 μL $min^{-1}$. This value constitutes 70% of the average slope of the corresponding polarization curve (39.6Ω).

Figure 6:
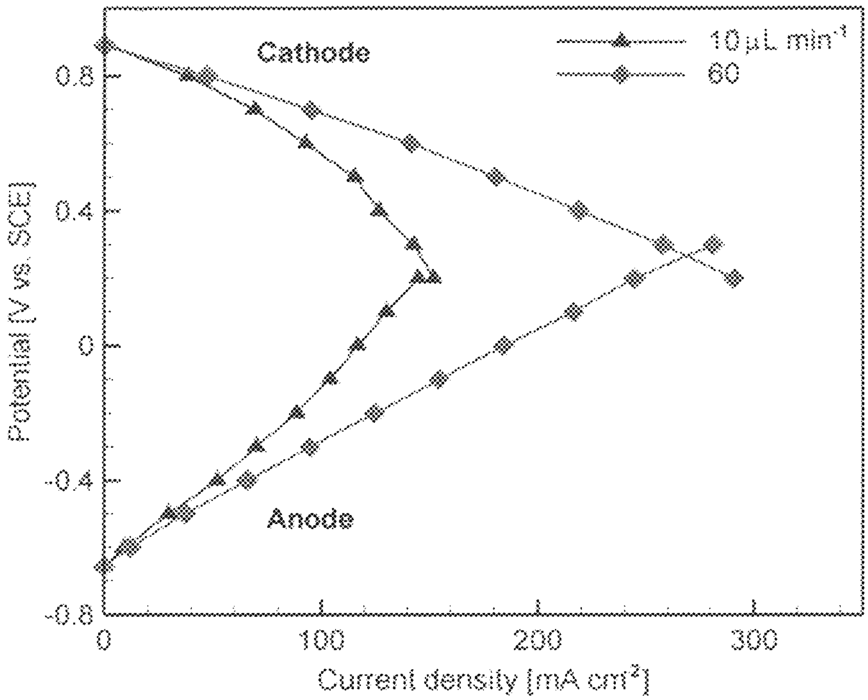
FIG. 6 shows steady state anodic and cathodic polarization data for the flow-through fuel cell measured in situ at room temperature under potentiostatic control, at two different flow rates (10 and 60 μL $min^{-1}$), using the opposite fuel cell electrode as counter electrode and an external SCE reference electrode.

Individual anodic and cathodic polarization curves for the flow-through cell are presented in FIG. 6 versus an external SCE reference electrode at two different flow rates. This type of plot is normally used in fuel cell analysis to assess which one of the electrodes is limiting the overall fuel cell performance. In this case, a highly symmetric polarization pattern was observed, indicating that neither of the electrodes imposed an overall restriction on the cell, and that the electrochemical system was well-balanced with respect to both electrochemical kinetics and mass transport. This desired characteristic confirms the viability of the proposed flow-through porous electrode architecture for microfluidic fuel cells.

Figure 7:
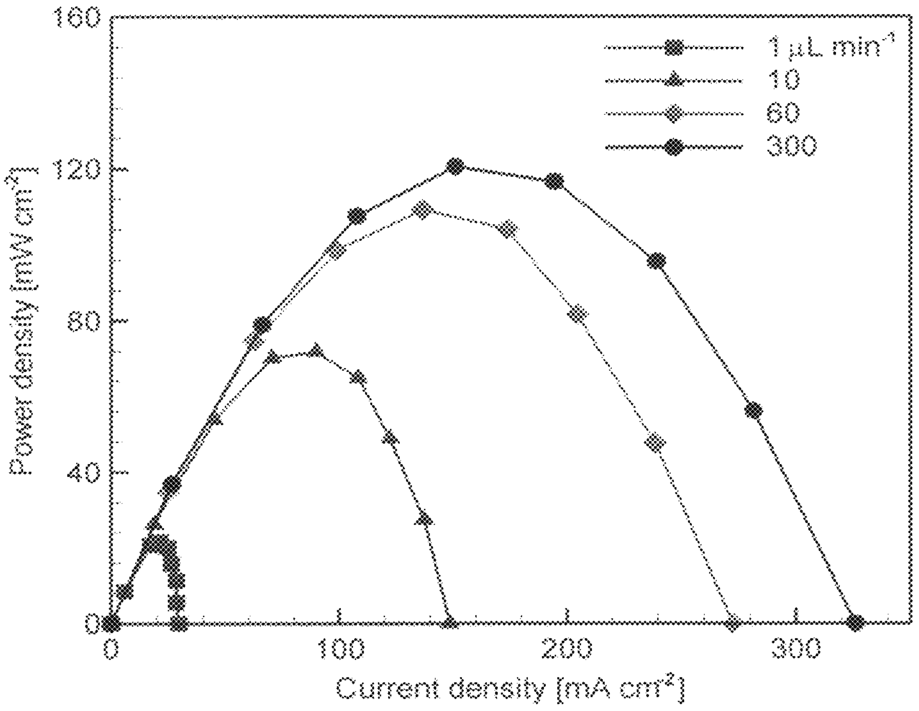
FIG. 7 shows flow-through fuel cell power density curves obtained from room temperature fuel cell polarization data at four different flow rates (as indicated).

Power density curves for the flow-through architecture fuel cell, calculated from the polarization data given in the previous section, are shown in FIG. 7. The overall power density increases considerably with flow rate, which again confirms the partial mass transport control. The highest power density obtained here was 121 mW $cm^{-2}$ at 0.8 V and 300 μL $min^{-1}$. Operation at higher flow rates would be possible, but with limited gain due to the high ohmic resistance. The parasitic power loss associated with pumping the solutions through the porous electrodes was estimated from the pressure drop for flow within porous media. Due to the low Reynolds number of the cross-flow (Re~$10^{-2}$), this pressure drop is quite small. The total pumping power required to sustain the flow through the porous electrodes and the surrounding channel structure is therefore estimated to be less than 1% of the fuel cell output power under typical conditions.

Figure 8:
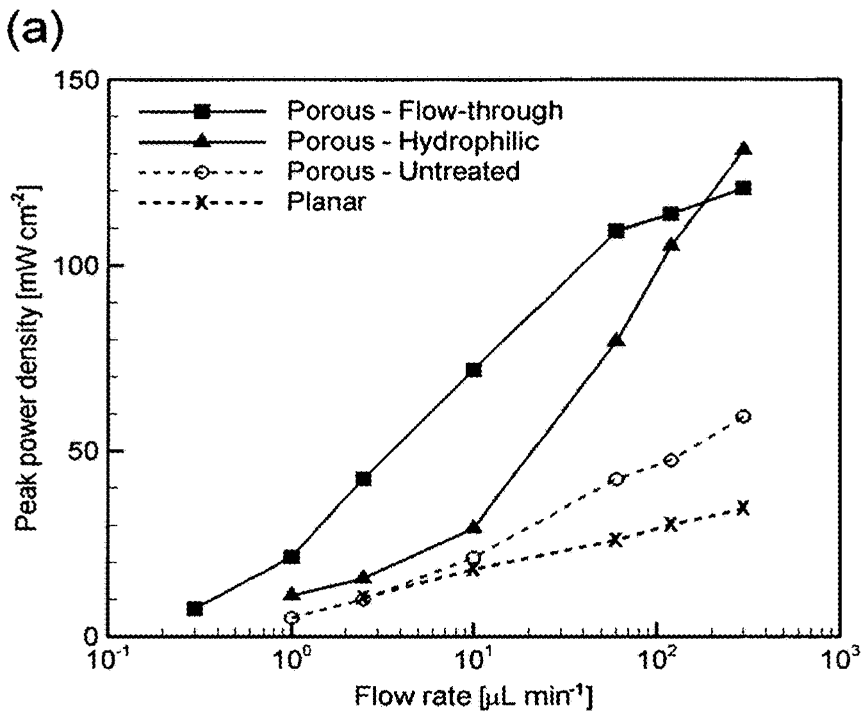
FIG. 8 shows a performance comparison between the flow-through architecture fuel cell and flow-over architecture fuel cells: (a) peak power density and (b) active fuel utilization at 0.8 V cell voltage, as a function of the flow rate (logarithmic).
Figure 8:
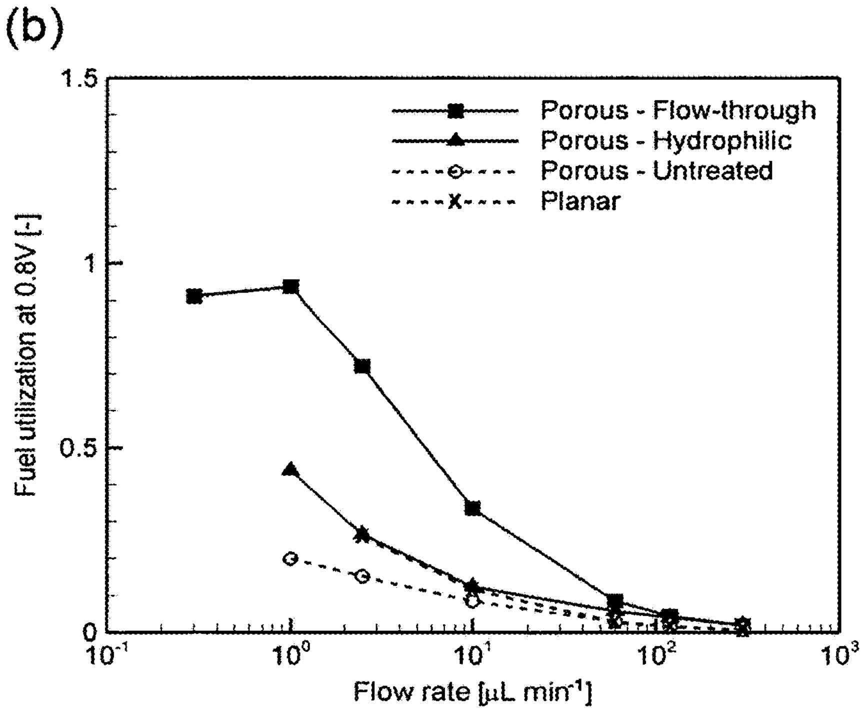

The performance of the microfluidic fuel cell with flow-through porous electrodes was compared to previous results obtained using flow-over architecture cells with planar electrodes or untreated porous electrodes mounted on the bottom of the co-laminar flow channel (flow-over electrodes). Also, in order to evaluate the performance benefits associated with hydrophilic heat treated porous electrodes, a flow-over cell incorporating hydrophilic porous electrodes was fabricated. In FIG. 8, a performance comparison based on (a) peak power density and (b) active fuel utilization at 0.8 V is provided. All plots are given as a function of flow rate per stream, which can be considered a measure of operational cost in terms of reactant supply. Compared to the flow-over cells using untreated porous electrodes, the flow-through architecture produced notably high power densities across all flow rates tested: the level of improvement ranges from two times at high flow rates to four times at low flow rates, as seen in FIG. 8*a*.

These power density levels confirm that a larger portion of the total active area was being utilized and that the convective/diffusive species transport to the active sites has been improved considerably. The flow-over fuel cell with hydrophilic porous electrodes also generated higher power density than the previous fuel cell with untreated porous electrodes, but generally less than the flow-through architecture. At the highest flow rate, however, the flow-over cell produced the highest peak power density, 131 mW $cm^{-2}$, as compared to 120 mW $cm^{-2}$ provided by the flow-through cell. The slope of the peak power density curve for the flow-through cell shows diminishing returns at high flow rates. This limitation of the flow-through cell is attributed to the ohmic resistance (27.7Ω) that is significantly higher than the flow-over cell (19.9Ω), as measured by EIS at 120 μL $min^{-1}$.

In addition to high power density levels, high Coulombic fuel utilization per single pass is desirable. FIG. 8*b* presents active fuel utilization measured at a practical cell voltage of 0.8 V as a function of flow rate for the four fuel cell designs. The flow-through architecture provided higher fuel utilization than all the other designs. The highest fuel utilization measured at this cell voltage was 94%, obtained with the flow-through architecture at 1 μL $min^{-1}$. At such high levels of fuel utilization, fuel and oxidant crossover is irrelevant, given that essentially all the reactants have been consumed while passing through the electrodes. The ability to combine high fuel utilization with high power density at high operational cell voltage is unique to the new microfluidic fuel cell architecture with flow-through porous electrodes. At 0.8 V, for example, the fuel cell produced 20 mW $cm^{-2}$ combined with 94% active fuel utilization under steady state operation. Based on the theoretical standard cell potential (1.246 V), this is equal to an overall single pass energy conversion efficiency of 60%.

If the reactions described in Eq. (1) and (2) are completed for all respective species, the fuel utilization is considered 100%. It is noteworthy, however, that the produced species still constitute a redox pair (i.e. $V^{3+}/VO^{2+}$), and thus there is potential to gain further electrons from their reaction at the respective electrodes. Through this effect nominal fuel utilization over 100% was in fact observed at low flow rates and low operational cell voltages (0.4 V). The data presented in FIG. 8*b* were measured at a more practical cell voltage of 0.8V, where the current contribution from the secondary redox reaction is negligible.

With the flow-through microfluidic fuel cell architecture demonstrated here, there is the additional opportunity for in situ regeneration. The initial fuel and oxidant species was regenerated by running the cell in an electrolytic format, i.e. pumping waste solution back into the cell and applying an electrolytic cell voltage. While holding the cell potential at 0.0 V (i.e. open-circuit) and running the flow in reverse at 1 μL $min^{-1}$, the cell current was zero and the solutions were green in both half-cells. Thereafter, the applied cell potential was held constant at 1.5 V while running the cell in reverse for 30 min. In this case, purple $V^{2+}$ and black $VO_2^+$ were identified in the anodic and cathodic half cells, respectively, and a steady regeneration current with a time-averaged current density of 45 mA $cm^{-2}$ was measured.

Example 3

(i) Preparation of Solutions

Alkaline formate fuel solution of concentration 1.2 M was obtained by adding 5 wt % concentrated formic acid (HCOOH; Fisher, Fair Lawn, N.J.) to a 10 wt % (2.8 M) sodium hydroxide (NaOH) electrolyte prepared by dissolving NaOH pellets (EMD Chemicals, San Diego, Calif.) in Millipore Milli-Q water (Millipore, Billerica, Mass.). After stabilization the obtained solution contained 1.2 M formate and 1.6 M $OH^-$. Alkaline hypochlorite ($ClO^-$) oxidant solution was prepared by dissolving 10 wt % NaOH pellets directly in a 5% sodium hypochlorite solution (NaOCl; Caledon, Georgetown, Canada) or 5.25% hypochlorite bleach (Javex-5; Colgate-Palmolive, Toronto, Canada). The gold (Au) plating solution consisted of 17 mM potassium gold cyanide ($KAu(CN)_2$; Degussa, Frankfurt, Germany) dissolved in Millipore Milli-Q water, followed by the successive addition of 0.4 M citric acid ($C_6H_8O_7$; Matheson Coleman & Bell, Montreal, Canada) and 0.4 M sodium citrate ($Na_3C_6H_5O_7$; Merck, Montreal, Canada) to a final pH of 3-5. The palladium (Pd) plating solution consisted of 1.0 wt % palladium(II) chloride ($PdCl_2$; SigmaAldrich) in 1 M hydrochloric acid (HCl; Anachemia, Montreal, Canada) in Millipore Milli-Q water. All chemicals used were ACS grade except the hypochlorite bleach.

(ii) Electrodeposition

Porous carbon electrodes subject to catalyst deposition were cut to 25 mm×1 mm strips from sheets of Toray carbon paper (B-2 Designation TGPH-090; E-TEK, Somerset, N.J.) with typical thickness 300 μm (measured), typical density 0.49 g $cm^{-3}$ and 78% porosity. A 20 mm long section of the carbon strips were rendered hydrophilic by annealing (~1 s) in a propane flame, and the hydrophilic electrodes were supported on glass slides with wires attached using PELCO® conductive silver 187 (Ted Pella Inc., Redding, Calif.) covered by regular epoxy. The strip electrodes were rinsed thoroughly in Millipore Milli-Q water before and after each plating sequence. Electrodeposition of Au and Pd on the porous carbon electrodes was performed by immersing the hydrophilic electrode parts in a bath containing either Au or Pd plating solution, together with a Pt mesh counter electrode and a saturated calomel reference electrode (SCE). The carbon working electrode was aligned with the counter electrode to obtain a uniform current distribution during plating. All electrochemical experiments in this study were driven by a PARSTAT 2263 potentiostat (Princeton Applied Research, Oak Ridge, Tenn.), and all individual electrode potentials are given versus the SCE (sat. KCl) reference electrode (0.241 V vs. SHE). Each electrodeposition experiment started with a cyclic voltammogram (3 cycles) of a bare porous carbon electrode in the Au plating solution from the open circuit potential (OCP) to −1.1 V, followed by electroplating under potentiostatic control at −1.1 V for 60 min. The Au loading of the obtained porous gold electrodes was not assessed. Porous Pd electrodes were obtained by electrodeposition of Pd on the fresh Au layer by a similar procedure: a cyclic voltammogram (3 cycles) was measured with the porous Au electrode in the Pd plating solution from the OCP to −0.1 V, followed by electroplating under potentiostatic control at 0.0 V until a desired loading of 5 mg $cm^{-2}$ had been deposited, typically after 20-30 min, calculated in real time by integrating the current profile and assuming a 60% coulombic plating efficiency. Scanning electron micrographs were captured by a Hitachi S-3500N scanning electron microscope with a tungsten filament operated at 15 kV.

(iii) Fuel Cell Fabrication

An array of microfluidic fuel cells with flow-through porous electrodes was assembled using in-house developed microfabrication techniques detailed above. In short, one 20 mm long porous Pd anode and one 20 mm long porous Au cathode were cut from the electrodeposited strip electrodes and fitted in custom-sized grooves (20 mm×1 mm×300 μm, separated by 1 mm), fabricated in a poly(dimethylsiloxane) (PDMS; Dow Corning, Midland, Mich.) part. The PDMS part had a dual layer structure: a 300 μm deep section that defined the two electrode grooves plus the two inlet channel structures, and a 150 μm deep layer accommodating the co-laminar flow channel between the electrodes, leading towards the outlet. The fourth wall of the microfluidic device was provided by a flat layer of PDMS, with previously punched holes for the inlets, outlet, and electrical contacts, which was sealed irreversibly on top of the other PDMS part after plasma-treating. External wiring was contacted to the exposed ends of the carbon strip electrodes using PELCO® conductive silver 187 covered with regular epoxy.

Example 4

(i) Fuel Cell Testing

The co-laminar flow of formate and hypochlorite solutions through the fuel cell was driven by a syringe pump (PHD 2000; Harvard Apparatus, Holliston, Mass.) via Teflon® tubing (1/16" diameter; S.P.E. Limited, North York, ON, Canada) to the inlets and through a larger Tygon® tube (3 mm diameter; Fisher Sci., Pittsburgh, Pa.) from the outlet to the outlet reservoir. The desired flow rate was adjusted and the co-laminar flow was stabilized before initiation of the electrochemical measurements. Cell polarization data were measured by chronoamperometry under stepwise potentiostatic control from the open circuit cell voltage down to 0.0 V by −0.2 V increments, using the PARSTAT potentiostat. The current transient generated by the cell was monitored until steady state was reached, which typically occurred within 180 s. Polarization of individual electrodes was measured versus an external SCE reference electrode placed in the outlet reservoir, using the opposite fuel cell electrode as counter electrode. Current densities and power densities reported here were calculated based on the vertically projected active area of the electrodes (0.12 $cm^2$). The ohmic resistance of the fuel cell and its individual electrodes was measured by electrochemical impedance spectroscopy (EIS), using the PARSTAT 2263 potentiostat. Impedance spectra were recorded at the open-circuit cell voltage, by applying an ac amplitude of 5 mV rms over the frequency range from 50 kHz to 0.5 Hz with 30 log spaced data points. The ohmic resistance was detected as the high-frequency real axis intercept of the Nyquist plot of impedance. For in situ EIS measurements, the flow rate was fixed at 60 μL $min^{-1}$.

(ii) Reaction Scheme

At the pH used here, the fuel exists predominantly as formate ($HCOO^-$), the oxidant as hypochlorite ($ClO^-$) and the $CO_2$ as carbonate. The reactions, written in terms of these species, lead to the following standard electrode potentials (vs. SCE) at 298 K:

Anode:

$$HCOO^-+3OH^-CO_3^{2-}+2H_2O+2e^-=-1.17\ V \quad (3)$$

Cathode:

$$ClO^-+H_2O+2e^-Cl^-+2OH^-=0.57\ V \quad (4)$$

Overall Cell Reaction:

$$HCOO^-+ClO^-+OH^-CO_3^{2-}+Cl^-+H_2O=1.74\ V \quad (5)$$

Note that the actual electrode and cell potentials also depend on pH and concentration of the aqueous species according to the Nernst equation. The formation of carbonates involves some net consumption of $OH^-$, which is available at high concentration in the alkaline electrolyte.

(iii) Electrodeposition of Porous Electrodes

Figure 9:
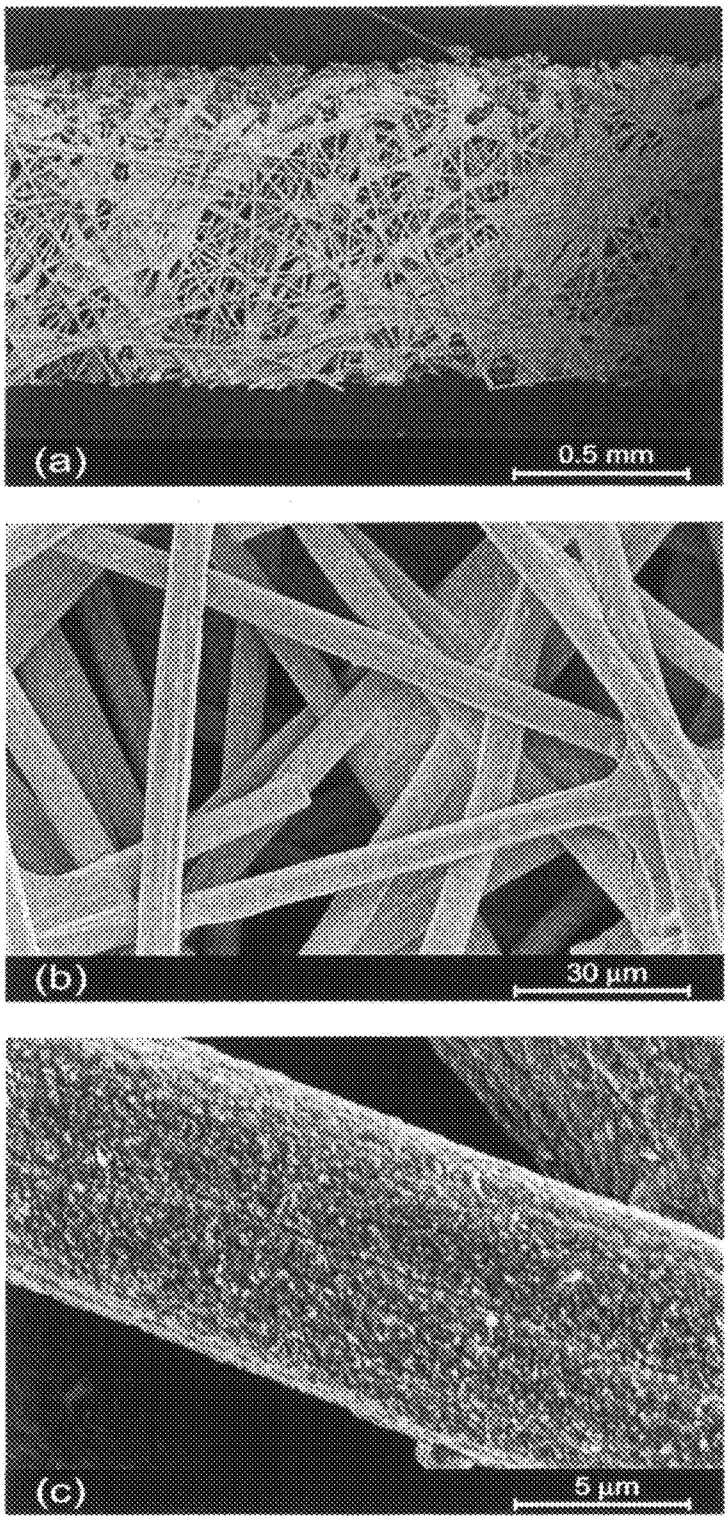
FIG. 9 includes images of the final porous gold electrodes captured by scanning electron microscopy.

To reduce the activation overpotentials of the proposed electrochemical reaction scheme, suitable catalysts need to be added to the electrodes. In this study, palladium (Pd) and gold (Au) were selected as the catalysts for anodic formate oxidation and cathodic hypochlorite reduction, respectively. Pd and Au were electrodeposited on porous carbon paper substrates in order to develop porous Pd and Au electrodes compatible with the unique co-laminar flow mechanism of the microfluidic fuel cell with flow-through porous electrode. Coating of the carbon fibers with Au may also be advantageous towards reducing the overall ohmic resistance of the electrodes, which was relatively high for the bare porous carbon electrodes used with this cell architecture. The overpotential for Au plating is relatively high; plating effectively started at −0.6 V, which was about 800 mV negative of the open circuit potential (OCP). Hydrogen evolution started at about −1.0 V on the first scan and at −0.8 V on consecutive scans. The difference between the cycles is associated with the fresh Au deposit on the carbon electrode that reduced the overpotential for hydrogen evolution, which is relatively high on bare carbon. Au plating below −0.8 V was therefore accompanied by hydrogen evolution. The viability of potentiostatic Au plating on porous electrodes was evaluated at three different potentials: −0.7 V, −0.9 V and −1.1 V. The plating current at −0.7 V was essentially free from hydrogen evolution and therefore quite low, although it showed a linear increase over time attributed to the nucleation and growth of Au grains. The plating currents measured at −0.9 V and −1.1 V were dominated by hydrogen evolution, which also increased over time as the surface area of the Au deposit was enlarged. With respect to the electrochemical performance of a porous electrode, both high coverage and high specific surface area are desirable characteristics. Granular Au structures were obtained at −0.7 V and at −0.9 V with limited coverage. At −1.1 V, however, a high degree of coverage was obtained with different surface morphology. Most importantly, the Au deposit appeared much more uniform over the observable depth of the porous electrode at −1.1 V compared to the other potentials. The porous Au electrode deposited at −1.1 V was further analyzed with images obtained at three different magnifications, shown in FIG. 9. These images demonstrate the quality of the obtained Au deposit in the context of fuel cell implementation. The outer surfaces of the electrode were uniformly coated, as seen in FIG. 9*a*; all observable fibers throughout the 3-D porous matrix showed effectively complete coverage, as seen in FIG. 9*b*; and the surface morphology had dendritic features with size <1 μm indicating a high specific surface area, as seen in FIG. 9*c*. The improved 3-D coverage at high overpotentials is attributed to the continuous hydrogen gas evolution introducing a local two-phase flow component. Specifically, as hydrogen bubbles were released from the porous matrix, fresh plating solution was introduced into the matrix. In sum, electrodeposition of Au on porous carbon electrodes was shown to be very effective at −1.1 V. Similarly fabricated porous Au electrodes were also used to make porous Pd electrodes, by coating an additional Pd layer (5 mg $cm^{-2}$).

(iv) Ex Situ Half-Cell Characterizations

Figure 10:
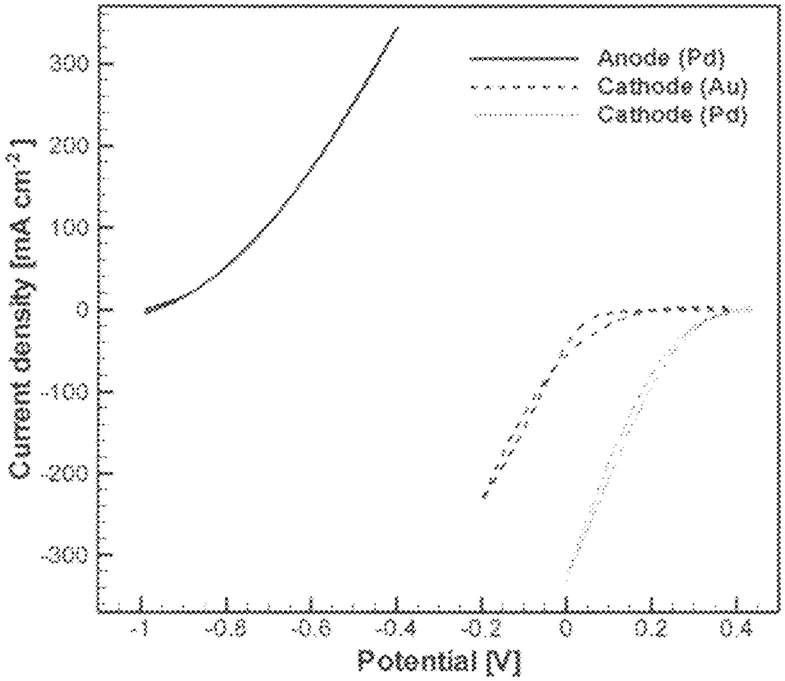
FIG. 10 shows cyclic voltammograms measured ex situ for formate oxidation and hypochlorite reduction on porous Pd and Au electrodes.

The porous Pd and Au electrodes were characterized electrochemically in a stationary three-electrode electrochemical cell in the alkaline formate or hypochlorite solutions, respectively, to analyze their performance and suitability for microfluidic fuel cell implementation. Cyclic voltammograms measured ex situ for a porous Pd anode, a porous Au cathode, and a porous Pd cathode are shown in FIG. 10. The Pd anode produced high current densities up to 340 mA $cm^{-2}$ at quite low overpotentials, in the absence of convective motion. As expected, no gas evolution was observed in this anodic half-cell, indicating that the product is carbonate, without any $CO_2$. The OCP of this half-cell was measured to −0.99 V, within 0.2 V of the standard potential of reaction (3). The ohmic resistance of the Pd anode was measured as 3.6Ω by electrochemical impedance spectroscopy (EIS).

The Au and Pd cathodes also delivered notably high current densities up to 230 and 330 mA $cm^{-2}$, respectively, despite the lack of convective transport. The Au cathode, however, exhibited a 250 mV higher overpotential than the Pd cathode for the hypochlorite reduction reaction (4). As shown, Au is not an ideal catalyst for hypochlorite reduction, but it does have a significant advantage with respect to integration in microfluidic fuel cells: in contrast to the Pd electrode that produced a small amount of gas during these tests, no gas evolution was observed on the Au electrode. The OCP for hypochlorite reduction was measured to 0.38 V (Au) and 0.46 V (Pd). The oxidation of water to oxygen can occur above 0.38 V at pH 14.4, the nominal pH of this solution, explaining the gas evolution in the case of Pd. The measured OCP was again within 0.2 V of the standard reduction potential (0.57 V). While not ideal for this reaction, the alkaline electrolyte is required to stabilize the hypochlorite solution. The ohmic resistance of the cathodes was measured by EIS to 3.0Ω (Au) and 2.9Ω (Pd). The electrical resistance of the Au coated electrodes was thus reduced by more than 50% compared to the bare carbon strip electrodes (7-9Ω). Overall, these half-cell experiments indicate that the alkaline formate anodic half-cell and the hypochlorite cathodic half-cell are well-suited to implementation in a microfluidic fuel cell.

An additional half-cell test was performed with the ACS-grade hypochlorite solution replaced with a low-cost household bleach product (Javex-5; Colgate-Palmolive), containing 5.25% sodium hypochlorite. The obtained cyclic voltammograms closely matched those in FIG. 10.

(v) Microfluidic Fuel Cell Implementation

Figure 11A:
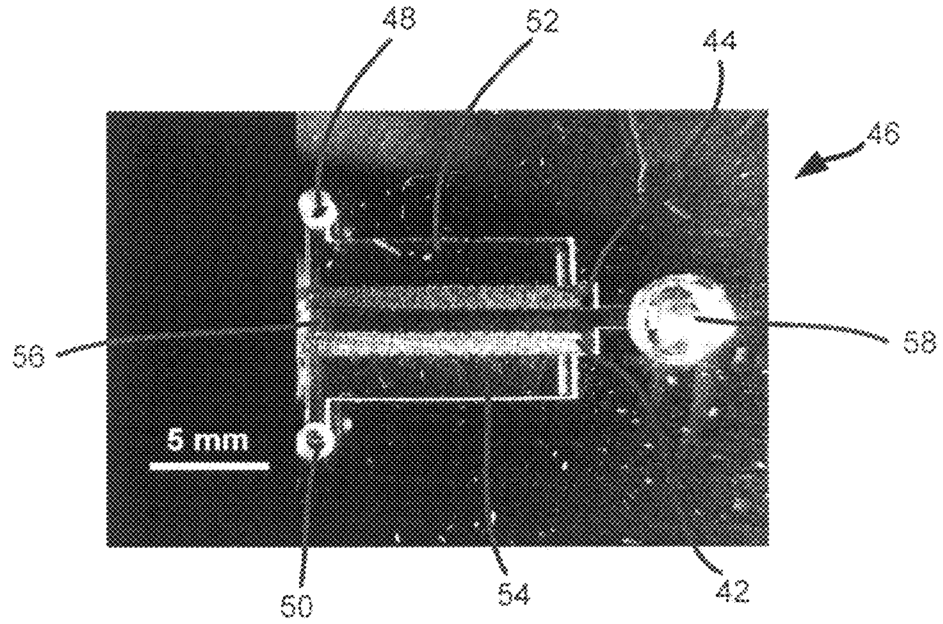
FIG. 11 illustrates a flow-through fuel cell with an electrodeposited porous Au cathode and an electrodeposited porous Pd/Au anode in accordance with an embodiment of the invention.
Figure 11B:
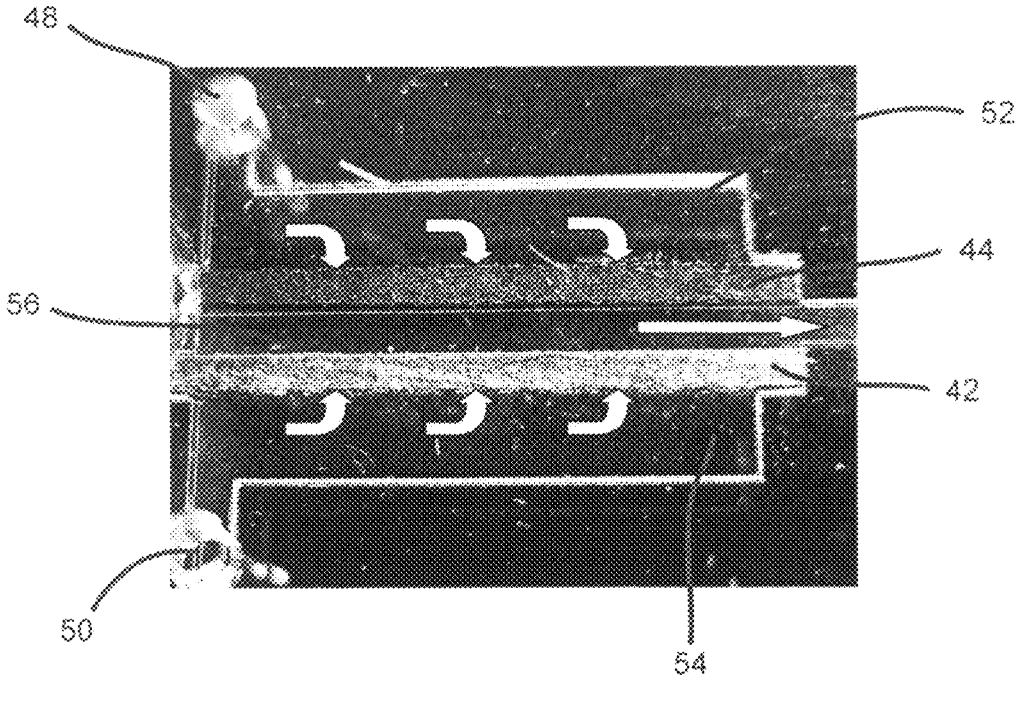

A microfluidic fuel cell with flow-through porous electrode architecture was fabricated, incorporating an electrodeposited porous Au electrode as cathode 42 and an electrodeposited porous Pd/Au electrode as anode 44. The assembled cell 46 is shown in FIG. 11. The transparency of the PDMS enables observation of the flow, and detection of any intermittent disturbances. The Au cathode 42 was chosen over the Pd cathode (that produced a small amount of gas in the ex situ experiments) for implementation in the fuel cell 46. As seen in FIG. 11*a*, the fuel and oxidant streams enter the microfluidic fuel cell device through separate inlets 48, 50 and approach the electrodes 42, 44 via the deep (300 μm) distribution channels 52, 54. From the distribution channels 52, 54, the flow is directed orthogonally into the porous electrodes 42, 44, as shown by the arrows in FIG. 11*b*.

The cross-flow through the porous media has two orders of magnitude higher pressure drop than the flow in the distribution channels, and is therefore expected to be uniformly distributed throughout the available cross-sectional area of the electrodes. In addition, the high cross-sectional area open to the cross-flow provides low mean velocities inside the porous electrodes, which enables ample opportunity for high coulombic fuel utilization. Both anodic and cathodic streams enter the center channel 56 through the electrodes 42, 44 on both sides at the same flow rate. The two streams are directed towards the outlet 58 in a co-laminar format. The center channel 56 is relatively shallow (150 μm) and has a small cross-sectional area in order to provide high mean velocities and reliable co-laminar flow. In this way mixing of the waste streams is limited to a relatively small diffusion width in the centre, while the electrolyte provides effective ionic transport. The flow-through electrode architecture 46 thus achieves utilization of the full depth of the electrode and associated active area, which is 20-30 times larger than the vertically projected area of the electrode, and provides enhanced species transport from the bulk to the active sites as well as effective ionic transport in a membraneless configuration.

(vi) Microfluidic Fuel Cell Performance

The assembled microfluidic fuel cell device with flow-through porous electrodes was operated at flow rates ranging from 2 to 300 μL $min^{-1}$ per stream, using formate anolyte and hypochlorite catholyte. The cell exhibited very stable co-laminar flow without any gas evolution or other disturbances and the open circuit cell potential was steady between 1.37 and 1.42 V, depending on the flow rate used. These cell potential levels are similar to the estimated cell potential from the ex situ experiments (1.37 V), calculated as the difference in OCP between the Pd anode and the Au cathode. The combined ohmic resistance of the cell was measured using EIS at open circuit and 60 μL $min^{-1}$ as 24.1Ω. This resistance measurement includes the solution resistance with respect to ionic transport in the co-laminar center channel and the electrical resistance in electrodes, contacts and wires. By incorporation of an external reference electrode (SCE) in the outlet reservoir, we were also able to measure the ohmic resistance of the individual electrodes in situ using the same technique, resulting in 7.0Ω for the anode and 12.8Ω for the cathode. These values are somewhat higher than the corresponding ex situ measurements (3.6Ω and 3.0Ω, respectively), primarily attributed to high electrical contact resistance on the chip. The solution resistance was estimated to 4.3Ω by subtracting the electrical resistance from the combined ohmic cell resistance.

Figure 12:
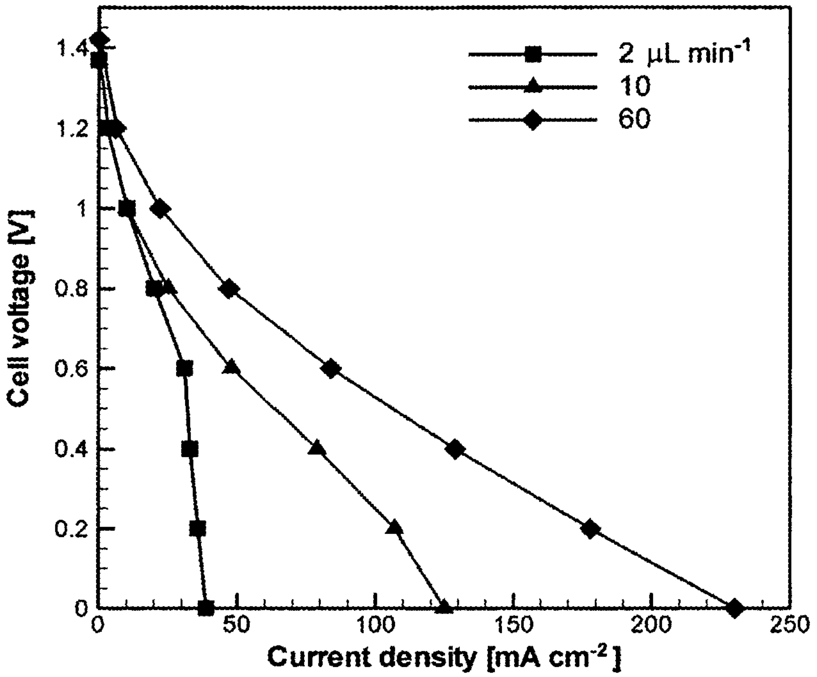
FIG. 12 shows polarization curves for the embodiment of FIG. 9.

Room-temperature polarization data were obtained under potentiostatic control at steady state conditions. FIG. 12 presents three different polarization curves obtained at 2, 10 and 60 μL $min^{-1}$. The current densities increased with flow rate up to a maximum 230 mA $cm^{-2}$ at 60 μL $min^{-1}$, indicating partial mass transport control and relatively fast electrochemical kinetics; however, increasing the flow rate above 60 μL $min^{-1}$ resulted in no significant performance improvements. Based on these observations, electrochemical kinetics and ohmic resistance were dominating at high flow rates. The parasitic combined ohmic resistance of the cell contributed almost 50% to the average slope of the polarization curve (51Ω) at 60 μL $min^{-1}$, and about 70% to the linear part of the curve at practical cell voltages of 0.8 V and below. At low flow rates, the potential loss associated with ohmic resistance was not as severe: it was less than 30% at 10 μL $min^{-1}$ and only about 8% at 2 μL $min^{-1}$. At these flow rates, the current densities were primarily controlled by the rate of reactant supply. The cell was not operated below 2 μL $min^{-1}$, although the stability of the co-laminar flow is expected to be maintained at least down to 0.3 μL $min^{-1}$.

Figure 13:
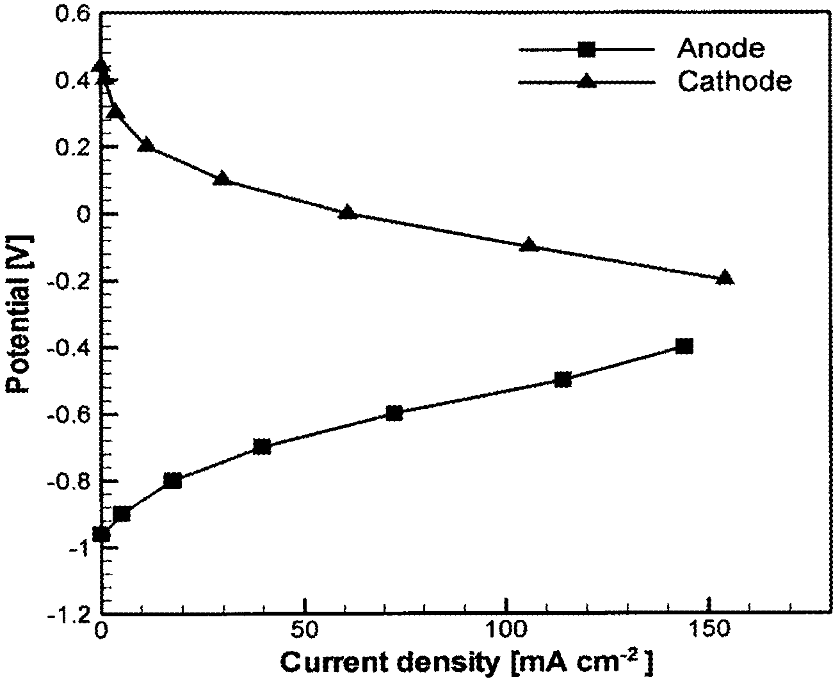
FIG. 13 shows separate anodic and cathodic polarization curves for the embodiment of FIG. 9.

The relatively low current densities produced in the high cell voltage range (1.0-1.4 V) indicate significant activation overpotential for the electrochemical reactions, which is common to most fuel cell systems. This effect was further analyzed by employing the external reference electrode (SCE) to measure the performance of the individual electrodes in situ under the same flow conditions, using the opposite electrode as counter electrode. Separate anodic and cathodic polarization curves are presented in FIG. 13. This type of analysis is often used to diagnose overall fuel cell performance and to identify half-cell-specific limitations. Provided the significant differences related to the electrochemistry of the formate oxidation and hypochlorite reduction reactions, the anodic and cathodic polarization curves are surprisingly well-balanced. The symmetry outlined by the two curves justifies the viability of the formate/hypochlorite fuel and oxidant combination and also confirms the uniform transport characteristics of the flow-through architecture. Both electrodes responded well to fuel cell operation at cell voltages below 1.0 V, where neither of them caused an overall restriction to the cell. The activation overpotential was shared by the two half-cells but dominated by the cathode. These results are in good agreement with the ex situ measurements, where the activation overpotential was quite high on the Au cathode.

Figure 14:
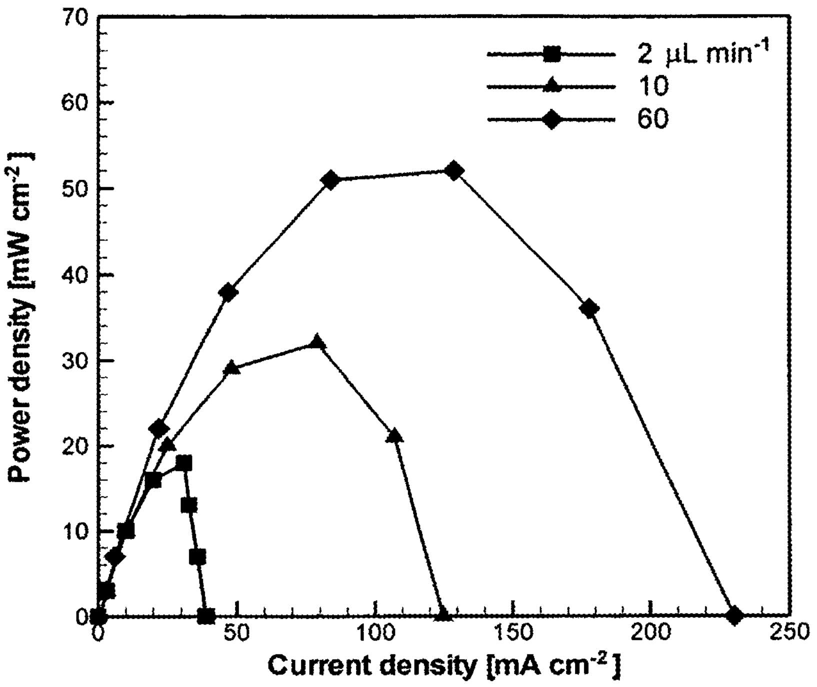
FIG. 14 shows power density curves for the embodiment of FIG. 9.

Power density curves calculated based on the polarization data at 2, 10 and 60 μL $min^{-1}$ are provided in FIG. 14. The overall power density increased significantly with flow rate, which again confirms the partial mass transport control. The highest power density measured in this study was 52 mW $cm^{-2}$ at 0.4 V and 60 μL $min^{-1}$. This level of power density compares favorably to most other microfluidic fuel cells reported to date and demonstrates the high capacity of the proposed formate/hypochlorite fuel and oxidant combination. The power densities measured here did not however reach the levels obtained with the vanadium redox system in the same cell architecture due to the lower cell voltages and reactant concentrations. The feasibility of the formate/hypochlorite system in the flow-through electrode architecture is more evident in the low flow rate regime. Even at the lowest flow rate (2 μL $min^{-1}$), a useful peak power density of 18 mW $cm^{-2}$ was generated at 0.6 V cell voltage. Fuel cell operation in this regime is very efficient due to the high levels of fuel utilization enabled by the flow-through electrode architecture and practical cell voltages achieved concurrently. The fuel utilization with respect to the hypochlorite component, which had a lower molar concentration (0.67 M) than the formic acid solution (1.2 M), was as high as 85% at the point of peak power and effectively 100% at low cell voltages. Based on the theoretical standard cell potential of 1.74 V, the overall energy conversion efficiency at 0.6 V was ~30% per single pass. The highly energy efficient fuel cell performance previously demonstrated with the vanadium redox system was thus maintained with the new formate/hypochlorite system.

The fuel cell performance measured here can also be compared to the ex situ half-cell characterizations provided by the cyclic voltammograms in FIG. 10. In contrast to the steady state fuel cell data, these predictions are based on unsteady operation (50 mV $s^{-1}$ scan rate) without flow, and the ohmic resistance was only about 3Ω per electrode. A fuel cell based on the performance measured in the ex situ experiments would theoretically have an open circuit voltage of 1.37 V (Au cathode) or 1.45 V (Pd cathode), and would produce peak power densities of 81 mW $cm^{-2}$ (Au cathode) and 143 mW $cm^{-2}$ (Pd cathode) at 0.35 V and 0.55 V cell voltage, respectively. These power density levels are much higher than those obtained in the microfluidic fuel cell, despite the lack of convective transport. This comparison indicates that the high capacity inherent to the formate/hypochlorite system was not fully exploited in the proof-of-concept microfluidic fuel cell, primarily due to its high parasitic ohmic resistance. While electrode contamination from the carbonate species is a possibility at high fuel concentrations, no detectable deterioration was observed in these tests.

Finally, we also assembled a microfluidic fuel cell with a Pd cathode, to evaluate the performance gains compared to the cell with a Au cathode, envisaged by the ex situ measurements. The cell generated an initial peak power density of 59 mW $cm^{-2}$ (at a flow rate of 60 μL $min^{-1}$), 13% higher than the previous cell, but the gas bubbles growing on the Pd cathode made its operation unstable shortly thereafter.

Example 5

A membraneless microfluidic fuel cell was designed with a grooved channel geometry that (i) utilizes gas evolution and unsteady two-phase flow characteristics to enhance local transport rates and time-averaged current density, and (ii) restricts gas bubble growth and expulsion to the channel sections directly above the electrodes in order to stabilize the co-laminar flow and prevent detrimental fuel and oxidant crossover effects.

Figure 15:
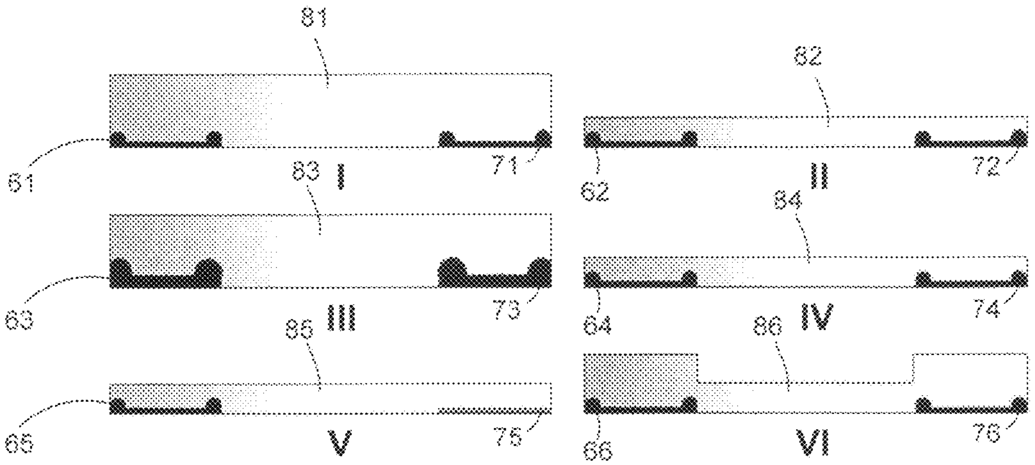
FIG. 15 illustrates schematics of the six different microfluidic fuel cell designs (I-VI) studied experimentally using formic acid fuel and hydrogen peroxide oxidant.

Six different microfluidic fuel cell devices were fabricated and operated using formic acid fuel and hydrogen peroxide oxidant. The cross-sectional geometries of the different fuel cell designs (cells I-VI) are shown in FIG. 15. Cells I-VI have anode 61, 62, 63, 64, 65, 66, respectively; cathodes 71, 72, 73, 74, 75, 76, respectively; and center channels 81, 82, 83, 84, 85, 86, respectively. Gas evolution was observed at both electrodes during fuel cell operation: product $CO_2$ at the anode, and oxygen at the cathode from the decomposition of hydrogen peroxide. The current densities produced by the cells with a rectangular channel cross-section (cells (I-V)) were unsteady at most flow rates due to significant gas evolution and unstable co-laminar flow characteristics. The best overall performance was achieved with cell VI with a channel 86 having grooved cross-sectional geometry.

Figure 16:
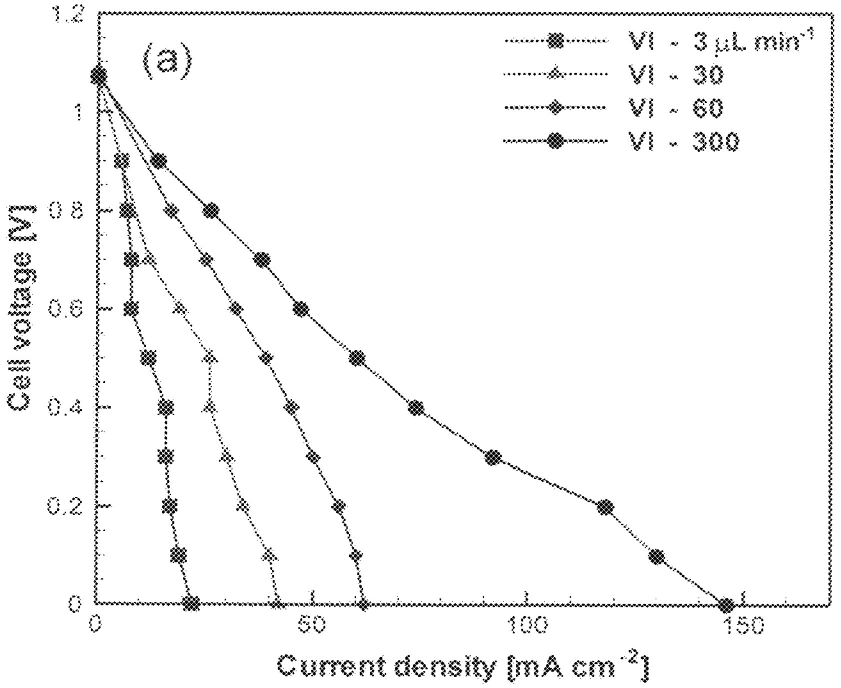
FIG. 16 shows polarization (a) and power density (b) curves obtained experimentally at flow rates ranging from 3 to 1000 μL $min^{-1}$. Fuel cell VI with a grooved channel geometry was employed using formic acid/hydrogen peroxide solutions.
Figure 16:
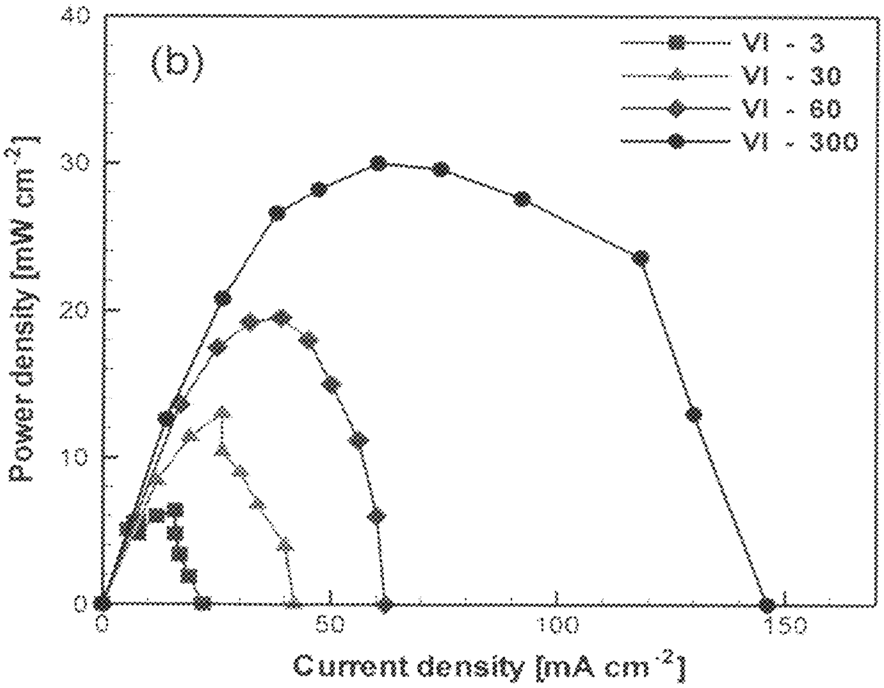

Polarization and power density curves for this cell are shown in FIG. 16 using standard solutions at different flow rates. Operation was demonstrated for flow rates spanning three orders of magnitude, with maintained open-circuit voltage near 1.1 V and current densities up to 150 mA $cm^{-2}$. In contrast to the other cells (I-V), fuel cell VI was capable of steady operation without crossover issues at flow rates as low as 3 μL $min^{-1}$, equivalent to a residence time of ~20 s. This is attributed to the cross-sectional shape of the channel: the channel sections directly above the electrodes are higher (140 μm) than the center part of the channel over the inter-electrode spacing (70 μm). Gas evolved from each electrode was trapped in the high channel sections directly above the respective electrode. The result was a source of $O_2$ to the cathode, and a containment of $CO_2$ over the anode. In addition, the grooved channel design enables preferential flow (higher velocity and transport rate) over the electrodes. Employing this cell design, detrimental crossover effects are minimized and the mixing interface is confined and stabilized in the center of the channel sufficiently far away from the edges of the electrodes; the produced $O_2$ is captured and constrained within the direct vicinity of the cathodic active sites.

The foregoing is an embodiment of the technology. As would be known to one skilled in the art, variations are contemplated that do not alter the scope of the invention. For example, if the electrochemical reaction requires a catalyst, this may be dispersed on the solid phase in the porous electrode. Further, the cell design can accommodate other aqueous reactants, or the cell design can be modified to accommodate gaseous reactants or products, in any manner known to one skilled in the art. Still further, an ion-exchange membrane may replace at least a part of the electrolyte if the fuel and/or oxidant streams contain electrolyte or if the solid phase of the porous electrode is layered with a permeable ion-conducting material.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A membraneless fuel cell for use with liquid reactants, the fuel cell comprising:

a first porous electrode and a second porous electrode, wherein the first porous electrode is a porous, electrically conductive anode having a porosity ranging from 40% to 95% and comprising an interstitial pore network, the porous anode being fluidly coupled to an anodic reactant inlet that flows anodic reactant orthogonally through the porous anode; and the second porous electrode is a porous, electrically conductive cathode having a porosity ranging from 40% to 95% and comprising an interstitial pore network, the porous cathode being fluidly coupled to a cathodic reactant inlet that flows cathodic reactant orthogonally through the porous cathode in a direction opposite to that of anodic reactant flow through the porous anode;

an electrolyte channel, defined by the anode and cathode, for receiving a parallel co-laminar flow of anodic reactant and product and cathodic reactant and product in liquid electrolyte through the electrolyte channel, wherein the parallel co-laminar flow of anodic reactant and product and cathodic reactant and product is in the same direction; and one reactant outlet per porous electrode;

wherein at least one of the first porous electrode or the second porous electrode is a hydrophilic porous electrode comprising a catalyst;

the electrolyte and the anodic reactant are mixed as they flow through the anode, and electrolyte and the cathodic reactant are mixed as they flow through the cathode; and the first and second porous electrodes and outlets are positioned to provide orthogonally arranged flow of liquid reactants towards the outlets, in use.

2. The membraneless fuel cell according to claim 1 wherein the catalyst is an electrocatalyst.

3. The membraneless fuel cell according to claim 1 wherein the catalyst is a biological catalyst.

4. The fuel cell of claim 1, wherein the anodic and cathode reactants are formic acid and hypochlorite, respectively.

* * * * *